(12) United States Patent
Oreshkin et al.

(10) Patent No.: US 11,526,733 B2
(45) Date of Patent: Dec. 13, 2022

(54) NEURAL NETWORK EXECUTION BLOCK AND TRANSFER LEARNING

(71) Applicant: ELEMENT AI INC., Montreal (CA)

(72) Inventors: Boris Oreshkin, Montreal (CA); Dmitri Carpov, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 385 days.

(21) Appl. No.: 16/854,595

(22) Filed: Apr. 21, 2020

(65) Prior Publication Data

US 2020/0372326 A1   Nov. 26, 2020

Related U.S. Application Data

(60) Provisional application No. 62/968,638, filed on Jan. 31, 2020, provisional application No. 62/851,334, filed on May 22, 2019.

(51) Int. Cl.
*G06N 3/04* (2006.01)
*G06K 9/62* (2022.01)
*G06N 3/08* (2006.01)

(52) U.S. Cl.
CPC ......... *G06N 3/0472* (2013.01); *G06K 9/6257* (2013.01); *G06N 3/0445* (2013.01); *G06N 3/08* (2013.01)

(58) Field of Classification Search
CPC ................................................... G06N 3/0454
USPC ............................. 706/13, 20, 26; 436/149
See application file for complete search history.

(56) References Cited

U.S. PATENT DOCUMENTS

| 7,152,051 B1* | 12/2006 | Commons | G06N 3/0454 706/20 |
|---|---|---|---|
| 2018/0376067 A1* | 12/2018 | Martineau | H04N 5/232 |
| 2019/0108833 A1* | 4/2019 | van den Oord | G10L 15/02 |

OTHER PUBLICATIONS

Ribeiro, M., et al. "Transfer learning with seasonal and trend adjustment for cross-building energy forecasting" Energy & Buildings 165, 2018, Elsevier B.V. 13 Pages.
Fawaz, H. I., "Transfer learning for time series classification" Dec. 2018, 2018 IEEE International Conference on Big Data (Big Data). 10 Pages.
Winter, P. R. "Forecasting Sales by Exponentially Weighted Moving Averages" Apr. 1960, vol. 6, No. 3, Management Science. 20 Pages.
(Continued)

*Primary Examiner* — Kiet M Doan
(74) *Attorney, Agent, or Firm* — Gowling WLG (Canada) LLP (57) ABSTRACT

Systems, architectures, and approaches for use with neural networks. An execution block and a system architecture using a novel execution block are disclosed along with how such an execution block can be used. The execution block uses a fully connected stack of layers and parameters of this fully connected stack of layers are shared. The fully connected nature of the block and on-the-fly generated parameters allow for bypassing specialized training data sets. The system may be trained using non-task-specific training data sets and this allows the system to transfer what is learned to execute a different task. Thus, instead of having to obtain a specialized training data set for a specific task, a more generic training data set can be used to train and prepare the system for that specific task. Results have shown that performance is as good as than the state of the art in providing solutions.

12 Claims, 4 Drawing Sheets

(56) References Cited

OTHER PUBLICATIONS

Assimakopoulos V. et al. "The theta model: a decomposition approach to forecasting" International Journal of Forecasting 16, 2000, Elsevier. 10 Pages.
Fiorucci, J. A., et al. "Models for optimising the theta method and their relationship to state space models" International Journal of Forecasting 32, 2016, Elsevier B.V. 12 Pages.
Spiliotis, E., et al "Forecasting with a hybrid method utilizing data smoothing, a variation of the Theta method and shrinkage of seasonal factors" International Journal of Production Economics, Jan. 3, 2019. 40 Pages.
Engle, R. F. ". Autoregressive conditional heteroscedasticity with estimates of the variance of United Kingdom inflation" Jul. 1982. vol. 50, Issue 4. Econometrica. 1982 The Econometric Society. 2002 JSTOR. 23 Pages.
Hyndman, R. J., et al. "Automatic Time Series Forecasting: The forecast Package for R" Journal of Statistical Software, Jul. 2008, vol. 27, Issue 3., American Statistical Association. 22 Pages.
Salinas, D., et al. "DeepAR: Probabilistic Forecasting with Autoregressive Recurrent Networks" International Journal of Forecasting, 2020, vol. 36, Issue 3, Elsevier. 12 Pages.
Wang, Y., et al. "Deep Factors for Forecasting" 36th International Conference on Machine Learning, 2019. PMLR 97, 2019. 16 Pages.
Rangapuram, S.S., et al. "Deep State Space Models for Time Series Forecasting" 2018, 32nd Conference on Neural Information Processing Systems. NeurIPS. 10 Pages.
Bengio, Y. "Learning a synaptic learning rule" 1990. Université de Montréal, Département d'informatique et de recherche opérationnelle. 6 Pages.
Ravi, S. et al. "Optimization as a Model for Few-Shot Learning" ICLR 2017. 11 Pages.
Finn, C., et al. "Model-Agnostic Meta-Learning for Fast Adaptation of Deep Networks" 34th International Conference on Machine Learning. PMLR 70, 2017. 13 Pages.
Snell, J., et al "Prototypical Networks for Few-shot Learning" 2017, 31st Conference on Neural Information Processing Systems, NIPS 2017. 11 Pages.
Vinyals, O., et al "Matching Networks for One Shot Learning" 2016, Advances in neural information processing systems. 12 Pages.
Rusu, A. A., et al "Meta-Learning With Latent Embedding Optimization" ICLR 2019. 17 Pages.
Smyl, S. "A hybrid method of exponential smoothing and recurrent neural networks for time series forecasting" International Journal of Forecasting 36, 2020, Elsevier B.V. 11 Pages.
Oreshkin, B. N., et al "N-Beats: Neural Basis Expansion Analysis for Interpretable Time Series Forecasting" ICLR 2020. 31 Pages.
Montero-Manso, P., et al. "FFORMA: Feature-based forecast model averaging" International Journal of Forecasting, 2019, Elsevier. 7 Pages.
Hooshmand, A., et al "Energy Predictive Models with Limited Data using Transfer Learning" Jun. 25-28, 2019. e-Energy'19. Phoenix, USA. 5 Pages.

\* cited by examiner

NEURAL NETWORK EXECUTION BLOCK AND TRANSFER LEARNING

RELATED APPLICATION

This application is a U.S. non provisional patent application which claims the benefit of U.S. provisional application No. 62/968,638 filed on Jan. 31, 2020 and U.S. provisional application No. 62/851,334 filed on May 22, 2019.

TECHNICAL FIELD

The present invention relates to computer technology and machine learning. More specifically, the present invention relates to a neural network-based building block architecture and to transfer learning and especially relating to time series problems.

BACKGROUND

Forecasting is one of the fundamental scientific problems and also of great practical utility. The ability to plan and control as well as to appropriately react to manifestations of complex partially or completely unknown systems often relies on the ability to forecast relevant observations based on their past history. The applications of forecasting span a variety of fields. These range from extremely technical (e.g. vehicle and robot control, energy consumption of buildings, data center optimization), to more business oriented (supply chain management, forecasting call center arrivals, and customer traffic in stores), and finally to ones that may be critical for the future survival of humanity, e.g. precision agriculture or fire and flood management. Unsurprisingly, forecasting methods have a long history that can be traced back to the very origins of human civilization, modern science and has consistently attracted considerable attention. The progress made in the univariate forecasting in the past 40 years is well reflected in the results and the methods considered in the associated competitions. Growing evidence suggests that machine learning approaches offer superior modeling methodology to tackle time-series forecasting tasks, contrary to some previous observations. For example, the winner of the competition on identifying the most accurate forecasting method(s) for different types of predictions was a deep neural network predicting parameters of a statistical model.

Notwithstanding their overall success in time-series forecasting, neural networks still leave a few open questions that we hope to address in this paper. Some of those are of practical nature and some others are more fundamental. On the practical side, the deployment of deep neural architectures is often challenged by the cold start problem. Before a tabula rasa deep neural network can provide a useful output, it should be trained on a large dataset specific to the problem. For early adopters, that often implies data collection efforts, changing data handling practices and even changing the existing IT infrastructures of massive scale. On the other hand, advanced statistical models can be deployed with significantly less effort as they train (or rather estimate their parameters) on a single time-series at a time.

Based on the above, there is a need for novel approaches and architectures that address the shortcomings of the prior art. Specifically, architectures and approaches that allow for implementation efficiencies are sought. Preferably, such architectures and approaches should outperform the well-known systems and methods currently used.

SUMMARY

The present invention provides systems, architectures, and approaches for use with neural networks. An execution block and a system architecture using a novel execution block are disclosed along with how such an execution block can be used. The execution block uses a fully connected stack of layers and parameters of this fully connected stack of layers are shared across the different execution blocks. The fully connected nature of the block and on-the-fly generated parameters allow for bypassing specialized training data sets. The system may be trained using non-task-specific training data sets and this allows the system to transfer what is learned to execute a different task. Thus, instead of having to obtain a specialized training data set for a specific task, a more generic training data set can be used to train and prepare the system for that specific task. Results have shown that performance is as good as than the state of the art in providing solutions.

In a first aspect, the present invention provides a neural network system for use in executing a task, the system comprising:
 a plurality of basis stacks, said basis stacks being coupled in sequence with each basis stack comprising at least one execution block, an output of each basis stack being added to a cumulative output for said neural network system;
 wherein
  at least one execution block comprises:
   a stack of fully connected layers of neural network nodes, said stack having an output being received in parallel by a first parallel branch and a second parallel branch;
   said first parallel branch comprising:
    a first fully connected layer of neural network nodes receiving said output and a first waveform generator sub-unit receiving an output of said first fully connected layer;
   said second parallel branch comprising:
    a second fully connected layer of neural network nodes receiving said output and a second waveform generator sub-unit receiving an output of said second fully connected layer;
   and wherein
   an output of said first parallel branch is a synthesis of basis functions of said execution block;
   an output of said second parallel branch is used to form a residual of an input to said execution block;
   parameters are shared between execution blocks.

In a second aspect, the present invention provides an execution block for use with a neural network system, the execution block comprising:
 a stack of fully connected layers of neural network nodes, said stack having an output being received in parallel by a first parallel branch and a second parallel branch;
 said first parallel branch comprising:
  a first fully connected layer of neural network nodes receiving said output and a first waveform generator sub-unit receiving an output of said first fully connected layer;
 said second parallel branch comprising:
  a second fully connected layer of neural network nodes receiving said output and a second waveform generator sub-unit receiving an output of said second fully connected layer;

wherein
an output of said first parallel branch is a synthesis of basis functions of said execution block;
an output of said second parallel branch is used to form a residual of an input to said execution block; and
parameters are shared between different execution blocks.

In a third aspect, the present invention provides a machine learning system for executing at least one task, the system comprising a plurality of execution blocks, said plurality of execution blocks sharing task-specific parameters between execution blocks, said task-specific parameters being generated by at least one of said plurality of execution blocks as necessary, each of said blocks comprising a stack of fully connected layers of neural network nodes.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect of the present invention, there is provided systems and components for use with neural networks. An execution block and a system architecture using that execution block are disclosed in this document. The execution block uses a fully connected stack of layers and one output is a forecast for a time series while another output is a backcast that can be used to determine a residual from the input to the execution block. The execution block uses a waveform generator sub-unit whose parameters can be judiciously selected to thereby constrain the possible set of waveforms generated. By doing so, the execution block specializes its function. The system using the execution block has been shown to be better than the state of the art in providing solutions to the time series problem. While the disclosure details an implementation that is used with forecasting a time series, other implementations for other tasks are, of course, possible.

In one aspect, the present invention addresses the problem of reducing the entry cost of deep neural networks in the industrial practice of time-series forecasting. Based on the present invention, it is viable to train a neural network model on a source dataset and deploy it on a target dataset in a zero-shot regime, i.e. without retraining on a lot of data for that time-series, resulting in performance that is at least as good as that of the most advanced statistical models, some of which are hand-tuned to a specific dataset. The time-series forecasting problem is distinct in that, unlike many others, one has to deal upfront with the challenge of out-of-distribution generalization: time-series are typically generated by systems whose generative distributions shift significantly over time. Transfer learning was not considered a viable approach in this domain until very recently. The present invention demonstrates the highly successful zero-shot operation of a deep neural time-series forecasting model.

To provide context to the present invention, the following document considers the univariate point forecast problem. Given the length of forecast horizon, H, the task is to predict (or forecast) the vector $y \in \mathbb{R}^H$, $y=[y_1, y_2, \ldots, y_H]$ of future values given a history $x \in \mathbb{R}^{dim(x)}$. We denote $\hat{y}$ as the forecast of y. For clarity, this document uses the metrics defined as:

$$sMAPE = \frac{1}{H} \sum_{i=1}^{H} \frac{2|y_i - \hat{y}_i|}{|y_i| + |\hat{y}_i|}$$

$$MASE = \frac{1}{H} \sum_{i=1}^{H} \frac{2|y_i - \hat{y}_i|}{\frac{1}{n-m}\sum_{j=m+1}^{n}|y_j - \hat{y}_j - m|}$$

$$OWA = 0.5[sMAPE/13.564 + MASE/1.912]$$

It should be noted that sMAPE (symmetric Mean Absolute Percentage Error) and MASE (Mean Absolute Scaled Error) are standard metrics widely used across the forecasting industry. OWA (Overall Weighted Average) is a metric based on the two other metrics above.

Figure 1:
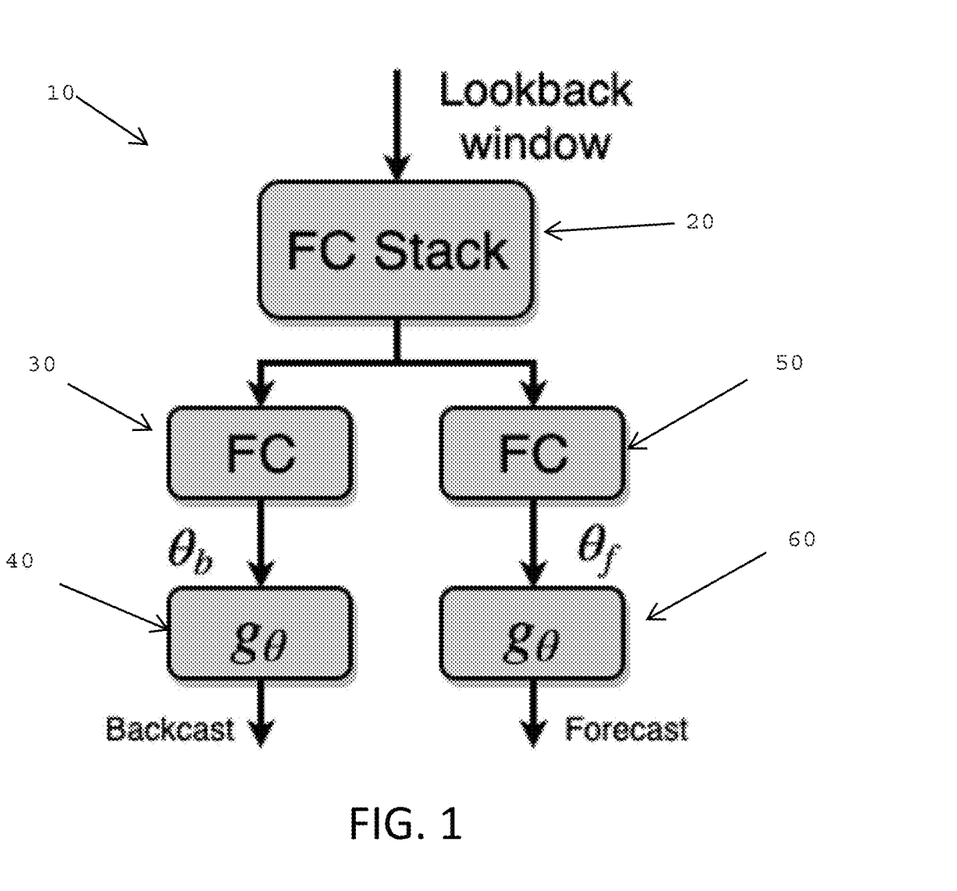
FIG. 1 is a schematic block diagram of an execution block according to one aspect of the present invention.

The present invention, in one aspect, provides a basic execution block that may be used in an architecture that is useful for solving the above noted time series/forecast problem. The basic building block or execution block is depicted in FIG. 1. The block accepts the input signal x and outputs two signals, $\hat{x}$ and $\hat{y}$. The input x is a history lookback window of certain length, $\hat{y}$ is the block's forward forecast of length H and $\hat{x}$ is the block's best estimate of x given the constraints on the functional space that the block can use to approximate signals. The length of the input window is a function of the length of forecast horizon, H, and typical lengths of x in our setup are 2H, 3H, . . . , 7H.

Internally, the basic building block consists of two distinct parts. First, the waveform generator $g_\theta$: $T^H \rightarrow Y^H$ is a map from the set of points in the time domain $T^H \subset \mathbb{R}^H$ to the set of points in the forecast value domain, $Y^H \subset \mathbb{R}$. The waveform generator is parameterized with a set of parameters $\theta \in \Theta$. Second, the forward and the backward predictors of parameters of the waveform generator, $\varphi_\phi^f : \mathbb{R}^{dim(x)} \rightarrow \Theta$ and $\varphi_\phi^b : \mathbb{R}^{dim(x)} \rightarrow \Theta$.

The function of $g_\theta$ is twofold: (i) providing a sufficiently rich set of time varying waveforms, selectable by varying $\theta$, and (ii) encoding the inductive bias specific to time-series forecasting domain in order to regularize and appropriately constrain the structure of viable solutions. The functions of $\varphi_\phi^f$ and $\varphi_\phi^b$ are related but are not exactly the same. Both of these predict parameters of $g_\theta$ and thus attempt to select the best waveform out of all available in the space spanned by $g_\theta$.

The basic building block is a stack of fully connected layers that predicts basis expansion coefficients both forward, $\theta$, (forecast) and backward, $\theta_b$, (backcast) based on the input time series window.

As can be seen in FIG. 1, the execution block 10 has a fully connected stack 20 of multiple neural network layers. This stack 20 has an output that is received by two parallel branches. The first branch has a fully connected layer 30 and the output of this layer 30 is received by a waveform generator sub-unit 40. The second branch also has a fully connected layer 50 and a similar waveform generator sub-unit 60. The output of the first branch is used for determining a residual of the execution block's input while the output of the second branch is used for a forecast.

Figure 2:
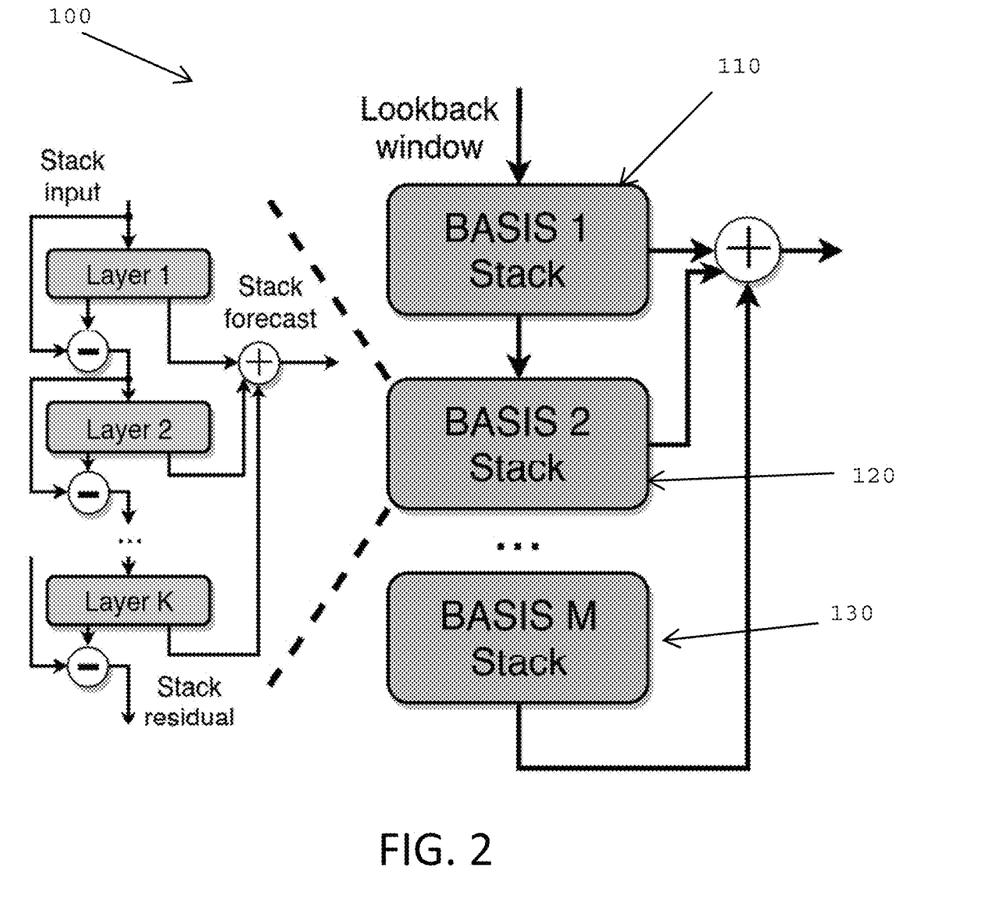
FIG. 2 is a schematic block diagram of a neural net system architecture according to another aspect of the present invention.

Referring to FIG. 2, a block diagram of a system architecture that uses the execution block in FIG. 1 is illustrated. The basic building blocks (layers) of the architecture are used to form a stack of layers corresponding to the same output basis functions. The weights of fully connected layers are shared within the basis stack. The stacks are further chained in a deep neural network.

Referring to FIG. 2, the system 100 has a number of basis stacks 110, 120, 130, each of which produces a forecast. Each of these forecast outputs is added to produce a system output. Within each basis stack are a number of layers, each of which is an instance of the execution block illustrated in FIG. 1. As can be seen, the forecast output of each layer/execution block is added to a stack forecast output. Each backcast output of each layer/execution block is used to determine the residual of the input to the layer/execution block and this residual is used as input to the immediately succeeding layer/execution block.

The architecture depicted in FIG. 2 has two residual branches, one running over backcast prediction branch of each block and the other is running over the forecast branch of each block. The backcast residual branch has the interpretation of running sequential analysis of the signal and the gradient backpropagated through the backcast residual branch drives the parameters of each block (FIG. 1) to facilitate the tasks performed by the blocks subsequent to it. The forecast residual branch is aggregated into the total forecast first at the level of the stack and then over stacks (hierarchical aspect). Each stack has the same $g\theta$ for each layer. The interpretation of the hierarchical forecast aggregation is then two-fold: (i) each layer down the stream is providing a more refined forecast and (ii) and more important, the forecasts aggregated at the stack level model an aspect of the forecast encoded in the nature of $g\theta$.

Figure 3:
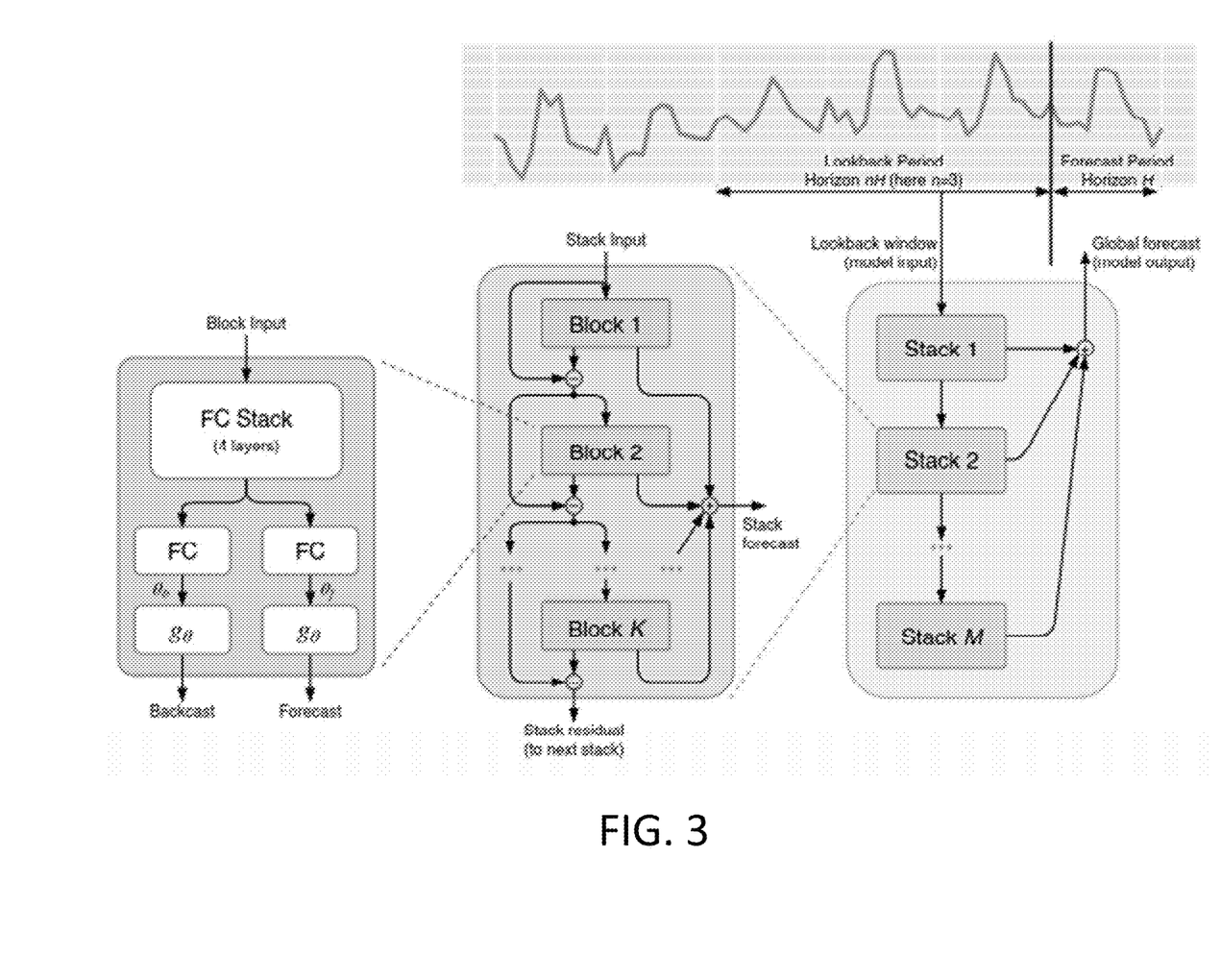
FIG. 3 is a schematic block diagram of one implementation of the present invention and illustrating how the various aspects can work together to form a whole system.

As can be seen, the basic building block depicted in FIG. 1 produces two outputs: the lookback window approximation in the block's basis (backcast) and a forecast based on the synthesis of its basis functions. The backcast output of each basic block is used to form the residual of the basic block's input with the block's approximation of the input in its basis. From FIG. 2, the forecast output is added to the output of the basis stack. The residual of the preceding layer is used as input of the next layer. The basic layers are stacked into a deep neural network. This current architecture and the relationship between sections is illustrated in FIG. 3.

The architecture of the present invention thus forces each execution block into a specialization. Instead of having an execution block that performs all the functions necessary for forecasting the succeeding entries in a time series, by constraining the range of wave functions used by the waveform generator, the execution block specializes into generating a smaller subset/group of waveforms. Thus, by judiciously constraining $g_\theta$, one can select each execution block's specialization.

In another aspect of the present invention, there is provided a broad category of uses for machine learning that can extend the applicability for transfer learning. The concept of meta-learning can discover generic ways of processing time-series so as to greatly improve generalization on new time-series from a very broad diverse set of sources. This disclosure provides positive evidence to demonstrate such a capability using a broad meta-learning framework. This framework subsumes many existing meta-learning methods as special cases. Also included below, using theoretical analysis, are meta-learning adaptation mechanisms within the machine learning architecture disclosed herein. The analysis below shows that that the present machine learning architecture of the invention dynamically generates a subset of its parameters based on a given time-series input, thereby dynamically expanding the expressive power of the architecture on-the-fly. The empirical results of experiments emphasize the importance of meta-learning for successful zero-shot time-series forecasting, showing that it is viable to train a neural network model on a source time-series dataset and to deploy that trained neural network model on a different target time-series dataset without retraining. This results in performance that is at least as good as that of advanced statistical models for time-series.

The architecture explained above can be seen as performing a form of meta-learning. This aspect of the architecture is explored in more detail below and a formal link with meta-learning is made by proposing a generalized framework for meta-learning that can be used with the present architecture as well as other machine learning models.

As noted above, the univariate point forecasting problem in discrete time is formulated given a length-H forecast horizon and a length- T observed series history $[y_1, \ldots, y_T] \in R^T$. The task is to predict the vector of future values $y \in R^H = [y_{T+1}, y_{T+2}, \ldots, y_T]$. For simplicity, we will later consider a lookback window of length $t \geq T$ ending with the last observed value $y_T$ to serve as model input, and denoted $x \in R^t = [y_{T-t+1}, \ldots, y_T]$. We denote $\hat{y}$ the point forecast of y. Its accuracy can be evaluated with smape, the symmetric mean absolute percentage error:

$$sMAPE = \frac{200}{H} \sum_{i=1}^{H} \frac{|y_{T+i} - \hat{y}_{T+i}|}{|y_{T+i}| + |\hat{y}_{T+i}|} \quad (1)$$

Other quality metrics (e.g. MAPE, MASE, OWA, ND) are possible.

Meta-learning or learning-to-learn has been listed among prerequisites for building intelligent machines. Meta-learning implies the ability to learn quickly to perform a new unseen task given the exposure to a multitude of previously experienced tasks. The ability to meta-learn is usually linked to being able to (i) accumulate knowledge across different tasks (i.e. transfer learning, multi-task learning, representation learning) and (ii) adapt quickly the accumulated knowledge to the new task (task adaptation). Accordingly, a classical meta-learning set-up is usually defined by assuming a distribution p(T) over tasks (where each task can be seen as a meta-example), a predictor $P_\Theta$ parameterized with parameters $\theta$ and a meta-learner parameterized with meta-parameters $\varphi$. Each task (a meta-example) includes a limited set of examples describing the nature of the task (task training data) and a set of examples used to evaluate the quality of solution to the task (task validation data). Broadly speaking, the objective is to design a meta-learner that can solve a new task by appropriately choosing predictor's parameters $\theta$ after observing task training data. The meta-learner is trained to do so by being exposed to a multitude of tasks in a training dataset $\{T_i^{train}\}$ sampled from p(T). For each task $T_i^{train}$, the meta-learner is requested to produce the solution to the task in the form of $P_\theta$ and the loss function for the task is used to optimize the meta-learner meta-parameters $\varphi$ based on the task validation data. Exposure to multiple training tasks enables the meta-learner with optimized meta-parameters $\varphi_{opt}$, to produce solutions $P_\theta$ that generalize well on a set of unseen tasks $\{T_i^{test}\}$ sampled from $p(T)$.

The architecture of the system illustrated in FIG. 1 has a hierarchical structure consisting of multiple stacks, each stack internally consisting of multiple blocks. Blocks are connected using a doubly residual architecture that is explained in detail in this document. Also below is a mathematical description of the operation of a single stack. As explained above, assuming that $\ell$ is the block index and L is the total number of blocks, each block has input $x_\ell$ and produces two outputs: the backcast $\hat{x}_\ell$ and the partial forecast $\hat{y}_\ell$. For the first block we define $x_1 \equiv x$, where $x$ is assumed to be the stack-level input from now on. The internal operations of a block are based on a combination of fully connected and linear layers. It has been found that it is viable to share parameters of these layers across blocks. For this aspect of the invention, the architecture is such that all learnable parameters are shared across different blocks. We define the k-th fully-connected layer in the $\ell$-th block, having ReLu non-linearity, weight matrix $W_k$, bias vector $b_k$ and input $h_{\ell,k-1}$, as $FC_k(h_{\ell,k-1}) \equiv ReLu(W_k h_{\ell,k-1} + b_k)$. With this notation, one block of the present architecture is described as:

$$h_{\ell,1} = FC_1(x_\ell), \ h_{\ell,2} = FC_2(h_{\ell,1}),$$
$$h_{\ell,3} = FC_3(h_{\ell,2}),$$
$$h_{\ell,4} = FC_4(h_{\ell,3}), \ \hat{x}_\ell = Q h_{\ell,4}, \ \hat{y}_\ell = G h_{\ell,4}, \quad (2)$$

where Q and G are linear operators which can be seen as linear bases, combined linearly with the $h_{\ell,4}$ coefficients. Finally, the stack-level double residual architecture is described by the following recursion (recalling that $x_1 \equiv x$):

$$x_\ell = x_{\ell-1} - \hat{x}_{\ell-1}, \ \hat{y} = \sum_\ell \hat{y}_\ell. \quad (3)$$

The parameters used with the current architecture and included in the FC and linear layers are learned by minimizing a suitable loss function (for example, sMAPE) across multiple time-series. The sharing of network parameters across multiple time-series implies the operation in the transfer learning regime. This is clear if we consider each time-series in a dataset as a separate task. For this aspect of the invention, the focus is on the zero-shot scenario when a network forecasts time-series that it never observed in any way at training time, successfully learning how to learn from a time-series. As detailed below, apart from the knowledge accumulation across tasks (i.e. across time-series), the current architecture has internal elements that enable on-the-fly task adaptation.

Meta-learning Framework

Defined below is a meta-learning framework that may be shown to subsume multiple meta-learning algorithms/processes as special cases. A meta-learning procedure can generally be viewed as learning iterations at two levels: the inner loop and the outer loop. The inner training loop operates at the level of an individual meta-example or task $T_i$ (fast learning loop) and the outer loop operates across tasks (slow learning loop). As discussed previously, a task $T_i$ includes task training data $D_{T_i}^{tr}$ and task validation data $D_{T_i}^{val}$. Both training and validation data contain (optionally) inputs, targets and a task-specific loss: $D_{T_i}^{tr} = \{X_{T_i}^{tr}, Y_{T_i}^{tr}, L_{T_i}\}$, $D_{T_i}^{val} = \{X_{T_i}^{val}, XY_{T_i}^{val}, L_{T_i}\}$. Task training data can be used to quickly adjust the behaviour of predictor to increase its chances of performing well whilst mapping observed inputs into predicted outputs in the task's validation set. We extend the definition of predictor originally provided above by allowing a subset of its parameters denoted $w$ to belong to meta-parameters $\varphi$ and hence to not be task adaptive. Therefore, in our framework, predictor $\mathcal{P}_{\theta,w}$ has parameters $\theta$ that can be adapted rapidly, at the task level; and meta-parameters $w$ that are simply set by the meta-learning procedure and are slowly learned across tasks.

Accordingly, the meta-learning procedure has three distinct ingredients: (i) meta-parameters $\varphi=(t_0,w,u)$, (ii) initialization function $I_{t_0}$ and (iii) update function $\mathcal{U}_u$. The meta-learner's meta-parameters $\varphi$ include the meta-parameters of the meta-initialization function, $t_0$, the meta-parameters of the predictor shared across tasks, $w$, and the meta-parameters of the update function, $u$. The meta-initialization function $I_{t_0}(\mathcal{D}_{T_i}, c_{T_i})$ defines the initial values of parameters $\theta$ for a given task $T_i$ based on its meta-initialization parameters $t_0$, task training dataset $\mathcal{D}_{T_i}$ and task meta-data $c_{T_i}$. Task meta-data may have, for example, a form of task id or a textual task description. The update function $\mathcal{U}_u(\theta_{\ell-1}, \mathcal{D}_{T_i}^{tr})$ is parameterized with update meta-parameters $u$. It defines an iterated update to predictor parameters $\theta$ at iteration $\ell$ based on their previous value and the task training set $\mathcal{D}_{T_i}^{tr}$. The initialization and update functions produce a sequence of predictor parameters, which can be compactly written as $\theta_{0:\ell} \equiv \{\theta_0, \ldots, \theta_{\ell-1}, \theta_\ell\}$. We let the final predictor be a function of the whole sequence of parameters, written compactly as $\mathcal{P}_{\theta_{0:\ell},w}$. One implementation of such a general function could be a B $\sum_\ell$ 1 ensemble or a weighted sum, for example: $\mathcal{P}_{\theta_{0:\ell},w}(\bullet) = \sum_{j=0}^\ell \omega_j \mathcal{P}_{\theta_j,w}(\bullet)$. If we set $\omega_j = 1$ if $j = \ell$ then we get the more commonly encountered situation $\mathcal{P}_{\theta_{0:\ell},w}(\bullet) \equiv \mathcal{P}_{\theta_\ell,w}(\bullet)$.

The meta-parameters $\varphi$ are updated in the outer meta-learning loop so as to obtain good generalization in the inner loop, i.e. by optimizing the expected validation loss $\mathbb{E}_{T_i} \mathcal{L}_{T_i}(\hat{y}_{T_i}, y_{T_i}^{val})$ that maps the ground truth and estimated outputs into the value that quantifies the generalization performance across tasks. The meta-learning framework is succinctly described by the following set of equations.

Parameters: $\theta$; Meta-parameters: $\varphi=(t_0, w, u)$

Inner Loop: $\theta_0 \leftarrow \mathcal{I}_{t_0}(\mathcal{D}_{T_i}^{tr}, c_{T_i})$ $$\theta_\ell \leftarrow \mathcal{U}_u(\theta_{\ell-1}, \mathcal{D}_{T_i}^{tr}), \ \forall \ell > 0 \quad (4)$$

Predict at $x$: $\mathcal{P}_{\theta_{0:\ell},w}(x)$

Outer Loop: $\varphi \leftarrow \varphi - \eta \nabla_\varphi \mathcal{L}_{T_i}[\mathcal{P}_{\theta_{0:\ell},w}(X_{T_i}^{val}), y_{T_i}^{val}].$ $$\quad (5)$$

Current Architecture as a Meta-learning Process

Below is an analysis of the current architecture as described by equations (2), (3). We first introduce the following notation:

$$f: x_\ell \mapsto h_{\ell,4}; \ g: h_{\ell,4} \mapsto \hat{y}_\ell; \ q: h_{\ell,4} \mapsto \hat{x}_\ell.$$

In the original equations, $g$ and $q$ are linear and hence can be represented by equivalent matrices G and Q. In the following, we keep the notation general as much as possible, transitioning to the linear case only at the end of our analysis. Then, given the network input, $x(x_1 \equiv x)$, and noting that $\hat{x}_{\ell-1} = q \circ f x_{\ell-1}$) we can write the output as follows:

$$\hat{y} = g \circ f(x) + \sum_{\ell>1} g \circ f(x_{\ell-1} - q \circ f(x_{\ell-1})). \tag{7}$$

Meta-Learning Framework Subsumes The Current Architecture

It can be shown that the current architecture can be derived from the meta-learning framework outlined above. This is based on two observations: (i) g∘f in (7) is a predictor and (ii) each block of the current architecture is the inner meta-learning task adaptation loop. More concretely, we have the following: $\mathcal{P}_{\theta,w}(\bullet) = g_{w_g} \circ f_{w_f,\theta}(\bullet)$. Here $w_g$ and $w_f$ are parameters of functions g and f in (7). The meta-parameters of the predictor, $w=(w_g, w_f)$, are learned across tasks in the outer loop. The parameters θ include the sequence of shift vectors, $\theta = \{\mu_\ell\}$ that we explain in detail next. The $\ell$-th block of the current architecture performs the adaptation of predictor's task-specific parameters of the form $\mu_\ell \ell \leftarrow \mu_{\ell-1} + \hat{x}_\ell$, $\mu_0 \equiv 0$. These parameters are used to adjust predictor's input at every iteration as $x_\ell = x - \mu_{\ell-1}$ as evident from equation (3).

This gives rise to the following initialization and update functions. $\mathcal{J}_{t_0}$ with $t_0 = 0$ sets $\mu_0$ to zero. $\mathcal{U}_u$, with $u=(w_q, w_f)$ generates the next parameter update based on $\hat{x}_\ell$:

$$\mu_\ell \leftarrow \mathcal{U}_u(\mu_{\ell-1}), \quad \mathcal{D}_{T_i^{tr}} \equiv \mu_{\ell-1} q_{w_q} \circ f_{w_f}(x - \mu_{\ell-1}).$$

Interestingly, (i) meta-parameters $w_f$ are shared between the predictor and the update function and (ii) the task training set is limited to the network input, $\mathcal{D}_{T_i^{tr}} \equiv \{x\}$. Note that the latter makes sense because the data are time-series, with the inputs x having the same form of internal dependencies as the target outputs y. Hence, observing x is enough to infer how to predict y from x in a way that is similar to how different parts of x are related to each other.

Finally, according to (7), predictor outputs corresponding to the values of parameters θ learned at every iteration of the inner loop are combined in the final output. This corresponds to choosing predictor of the form $\mathcal{P}_{\theta_{0:L},w}(\bullet) = \sum_{j=0}^{L} \omega_j \mathcal{P}_{\mu_j,w}(\bullet), \omega_j = 1, \forall j$ in (5). The outer learning loop (5) describes the architecture's training procedure across tasks (time-series) with no modification.

It is clear that the final output of the architecture depends on the entire sequence $\{\mu_\ell\}$. Quite obviously, even if predictor parameters $w_g$, $w_f$ are shared across blocks and fixed, the behaviour of $\mathcal{P}_{\theta_{0:L},w}(\bullet) = g_{w_g} \circ f_{w_f,\theta_{0:L}}(\bullet)$ is governed by an extended space of parameters $(w, \mu_1, \mu_2, \ldots)$. This has two consequences. First, the expressive power of the architecture grows with the growing number of blocks, in some proportion to the growth of the space spanned by $\{\mu_\ell\}$, even if $w_g$, $w_f$ are fixed and shared across blocks. Second, since the number of parameters describing the architecture behaviour grows with the number of blocks, it should lead to a phenomenon similar to overfitting. Therefore, it would be reasonable to expect that at first the addition of blocks will improve generalization performance, because of the increase in expressive power. However, at some point adding more blocks will hurt the generalization performance, because of an effect similar to overfit, even if $w_g$, $w_f$ are fixed and shared across blocks.

Linear Approximation Analysis

Next, we go a level deeper in the analysis to uncover more intricate task adaptation processes. To this end, we study the behaviour of (7) assuming residual corrections $\hat{x}_{\ell-1}$ are small. This allows us to derive an alternative interpretation of the meta-learning operation of the current architecture, expressing it in terms of the adaptation of the internal weights of the network based on the task input data. Under the assumption of small $\hat{x}_{\ell-1}$, (7) can be analyzed using a Taylor series expansion, $g \circ f(\mathbf{X}_{\ell-1} - q \circ f(\mathbf{X}_{\ell-1})) = g \circ f(\mathbf{X}_{\ell-1}) - J_{g \circ f}(\mathbf{X}_{\ell-1}) q \circ f(\mathbf{X}_{\ell-1}) + o(\|q \circ f(\mathbf{X}_{\ell-1})\|)$ in the vicinity of $x\ell_{-1}$. This results in the following first order approximation:

$$\hat{y} = g \circ f(x) + \sum_{\ell>1} [g - J_{g \circ f}(x_{\ell-1})q] \circ f(x_{\ell-1}) + o(\|q \circ f(x_{\ell-1})\|).$$

Here $J_{g \circ f}(\mathbf{X}_{\ell-1}) = J_g(f(\mathbf{X}_{\ell-1})) J_f(\mathbf{x}_{\ell-1})$ is the Jacobian of g∘f and o(•) is the small O in Landau notation.

We now consider linear g and q, as mentioned earlier, in which case g and q are represented by two matrices of appropriate dimensionality, G and Q; and $J_g(f(\mathbf{x}_{\ell-1})) = G$. Thus, the above expression can be simplified as:

$$\hat{y} = Gf(x) + \sum_{\ell>1} G[I - J_f(x_{\ell-1})Q] f(x_{\ell-1}) + o(\|Qf(x_{\ell-1})\|).$$

Continuously applying the linear approximation $f(\mathbf{x}_\ell) = G[I - J_f(\mathbf{x}_{\ell-1})Q] f(\mathbf{x}_{\ell-1}) + o(\|Qf(\mathbf{x}_{\ell-1})\|)$ until we reach $\ell = 1$ and recalling that $x_1 = x$ we arrive at the following:

$$\hat{y} = \sum_{\ell>0} G \left[ \prod_{k=1}^{\ell-1} [I - J_f(x_{\ell-k})Q] \right] f(x) + o(\|Qf(x_\ell)\|). \tag{8}$$

Note that $G(\prod_{k=1}^{\ell-1} [I - J_f(\mathbf{x}_{\ell-k})Q])$ can be written in the form of sequential updates of G. Consider $G'_1 = G$, then the update equation for G' can be written as $\mathbf{G}'_\ell = \mathbf{G}'_{\ell-1}[I - J_f(\mathbf{x}_{\ell-1})Q]$, $\forall \ell > 1$ and (8) becomes:

$$\hat{y} = \sum_{\ell>0} G'_\ell f(x) + \sum_{\ell>1} o(\|Qf(x_{\ell-1})\|). \tag{9}$$

Let us now discuss how the results of the linear approximation analysis can be used to re-interpret the current architecture as an instance of the meta-learning framework (4) and (5). According to (9), the predictor can now be represented in a decoupled form $\mathcal{P}_{\theta,w}(\bullet) = g_\theta \circ f_{w_f}(\bullet)$. Thus, in the predictor, task adaptation is now clearly confined in the decision function, $g_\theta$, whereas the embedding function $f_{w_f}$ only relies on fixed meta-parameters $w_f$. The adaptive parameters $\theta$ include the sequence of projection matrices $\{G'^\ell\}$. The meta-initialization function $\mathcal{G}_{t_0}$ is parameterized with $t_0 \equiv G$ and it simply sets $G'_1 \leftarrow t_0$. The main ingredient of the update function $\mathcal{U}_u$ is, as before, $q_{w_q} \circ f_{w_f}(\bullet)$. Therefore, it is parameterized with $u=(w_q, w_f)$ same as above. The update function now consists of two equations:

$$G'_\ell \leftarrow G'_{\ell-1}[I - J_f(x - \mu_{\ell-1})Q], \forall \ell > 1$$

$$\mu_\ell \leftarrow \mu_{\ell-1} + q_{w_q} \circ f_{w_f}(x - \mu_{\ell-1}), \mu_0 = 0 \quad (10)$$

It can be seen that, in the linearized analysis, the sequence of input shifts $\{\mu_\ell\}$ becomes an auxiliary internal instrument of the update function. It is used to generate a good sequence of updates $\{G'_\ell\}$ to the final linear layer $G'$ of predictor via an iterative two-stage process. First, for a given previous location in the input space, $x - \mu_{\ell-1}$, the new location in the input space is predicted by $q_{w_q} \circ f_{w_f}(\bullet)$. Second, the previous location in the input space is translated in the update of $G'$ by appropriately projecting $G'_{\ell-1} J_f(x - \mu_{\ell-1})$ via Q. The first order analysis result (9) shows that under certain circumstances, the block-by-block manipulation of the input sequence apparent in (7) is equivalent to producing a sequential update of the final linear layer apparent in (10), with the block input being set to the same value and fixed.

A role in this process seems to be encapsulated in Q that is responsible for both generating the sequence of input shifts $\mu_\ell$ and for the re-projection of derivatives $J_f$. We study this aspect in more detail in the next section.

The Role of Q

It is hard to study the form of Q learned from the data in general. However, equipped with the results of linear approximation analysis presented above, we can study the case of a two-block network, assuming that the L2 norm loss between y and $\hat{y}$ is used to train the network. If, in addition, the dataset consists of the set of N pairs $\{x^i, y^i\}_{i=1}^N$ the dataset-wise loss $\mathcal{L}$ has the following expression:

$$\mathcal{L} = \sum_i \left\| y^i - 2Gf(x^i) + J_{g \circ f}(x^i) Q f(x^i) + o(\|Qf(x^i)\|) \right\|^2$$

Introducing $\Delta y^i = y^i - 2Gf(x^i)$, the error between the default forecast $2Gf(x^i)$ and the ground truth $y^i$, and expanding the L2 norm we obtain the following:

$$\mathcal{L} = \sum_i \Delta y^{iT} \Delta y^i + 2\Delta y^{iT} J_{g \circ f}(x^i) Q f(x^i) + $$

$$f(x^i)^T Q^T J_{g \circ f}^T(x^i) J_{g \circ f}(x^i) Q f(x^i) + o(\|Qf(x^i)\|).$$

Now, assuming that the rest of the parameters of the network are fixed, we have the derivative with respect to Q using matrix calculus:

$$\frac{\partial \mathcal{L}}{\partial Q} = \sum_i 2 J_{g \circ f}^T(x^i) \Delta y^i f(x^i)^T + $$

$$2 J_{g \circ f}^T(x^i) J_{g \circ f}(x^i) Q f(x^i) f(x^i)^T + o(\|Qf(x^i)\|).$$

Using the above expression we conclude that the first order approximation of optimal Q satisfies the following equation:

$$\sum_i J_{g \circ f}^T(x^i) \Delta y^i f(x^i)^T = -\sum_i J_{g \circ f}^T(x^i) J_{g \circ f}(x^i) Q f(x^i) f(x^i)^T.$$

Although this does not help to find a closed form solution for Q, it does provide a quite clear intuition: the LHS and the RHS are equal when $\Delta y^i$ and $J_{g \circ f}(x^i) Q f(x^i)$ are negatively correlated. Therefore, Q satisfying the equation will drive the update to G in (10) in such a way that, on average, the projection of $f(x)$ over the update $J_{g \circ f}(x)Q$ to matrix G will tend to compensate the error $\Delta y$ made by forecasting y using G based on meta-initialization.

Factors Enabling Meta-learning

Let us now analyze the factors that enable the meta-learning inner loop clear in (10). First, and most straightforward, it is not viable without having multiple blocks connected via the backcast residual connection: $x_\ell = x_{\ell-1} - q \circ f(x_{\ell-1})$. Second, the meta-learning inner loop is viable when f is non-linear: the update of G is extracted from the curvature of f at the point dictated by the input x and the sequence of shifts $\{\mu_\ell\}$. Indeed, suppose f is linear, (i.e., F), the Jacobian $J_f(x_{\ell-1})$ would become independent of $x_{\ell-1}$ and equal to F. Equation (8) simplifies as (note that for linear f, (8) is exact):

$$\hat{y} = \sum_{\ell > 0} G[I - FQ]^{\ell-1} Fx.$$

Therefore, $G \sum_{\ell > 0} [I - FQ]^{\ell-1}$ may be replaced with an equivalent $G'$ that is not data adaptive.

Interestingly, $\sum_{\ell > 0} [I - FQ]^{\ell-1}$ happens to be a truncated Neumann series. Denoting Moore-Penrose pseudo-inverse as $[\bullet]^+$, assuming boundedness of FQ and completing the series, $\sum_{\ell=0}^{\infty} [I - FQ]^{\ell}$, results in $\hat{y} = G[FQ]^+ Fx$. certain conditions, the current architecture with linear f and an infinite number of blocks can be interpreted as a linear predictor of a signal in colored noise. Here the $[FQ]^+$ part cleans the intermediate space created by projection F from the components that are undesired for forecasting and G creates the forecast based on the initial projection Fx after it is "sanitized" by $[FQ]^+$.

Zero-Shot Time-Series Forecasting Task

Base datasets. Regarding the datasets used in experiments, the test dataset contains 100 k time-series representing demographic, finance, industry, macro and micro indicators. Sampling frequencies include yearly, quarterly, monthly, weekly, daily and hourly. Another dataset used contains 3003 time series from domains and sampling frequencies similar to the test dataset. Over the past 20 years, this dataset has supported significant efforts in the design of advanced statistical models, e.g. Theta and its variants. A further dataset used includes monthly, quarterly and yearly series of indicators related to tourism activities supplied by governmental tourism organizations and various academics, who had used them in previous studies. Yet another dataset used represents the hourly electricity usage monitoring of 370 customers over three years. Another, traffic based, dataset tracks hourly occupancy rates scaled in (0,1) range of 963 lanes in the San Francisco bay area freeways over a period of slightly more than a year.

The zero-shot forecasting task definition. One of the base datasets, a source dataset, is used to train a machine learning model. The entirety of the source dataset can be used for training. The trained model forecasts time-series in a target dataset. The source and the target datasets are distinct: they do not contain time-series whose values are linear transformations of each other. The forecasted time-series is split into two non-overlapping pieces: the history, and the test. The history is used as model input and the test is used to compute forecast error metric. We use the history and the test splits for the base datasets consistent with their original publication, unless explicitly stated otherwise. To make forecasts, the model is allowed to access time-series in the target dataset on a one at a time basis. This is to avoid the model from implicitly learning/adapting based on any information contained in the target dataset other than the history of the forecasted time-series. If any adjustments of model parameters or hyperparameters are necessary, they are allowed exclusively using the history of the forecasted time-series.

Empirical Results

The results of experiments with zero-shot forecasting using the current architecture as compared to other statistical methods are detailed in Table 1. It should be clear that, in Table 1, the current architecture is listed as N-BEATS. The key empirical results from experiments are based on aggregate zero-shot transfer performance metrics using the test dataset as the source dataset over several target datasets—listed as the M3, TOURISM, ELECTRICITY and TRAFFIC datasets—appear in Table 1. More detailed descriptions of the datasets are provided above. For each dataset, we compare our results with best 5 entries for this dataset reported in the literature, according to the customary metrics specific to each dataset.

Table 1 lists performance metrics on the various test sets, aggregated over each dataset. Evaluation metrics are specified for each dataset and lower values are better. The number of time series in each dataset is provided in brackets.

trained on those datasets. Second, the generalization gap between the current architecture trained on a given dataset and the current architecture operating in a zero-shot regime is noticeable, however the model clearly does not break in the zero-shot regime. Notably, on two datasets, the zero-shot forecasting performance of the current architecture is better than the performance of Theta (the winner of a forecasting competition).

The results overall suggest that a neural model of the current architecture is able to extract general knowledge about the time-series forecasting task and then successfully adapt it to forecast on unseen datasets. The present invention presents the first example of successfully applying a neural model in a zero-shot regime to a time-series forecasting task.

The Study Of Meta-Learning Effects

This section discusses the effects of meta-learning predicted by the theoretical analysis presented above. In particular, noted above is the implication that the current architecture internally generates a sequence of parameters that dynamically extends the expressive power of the architecture with each newly added block, even if all block parameters are shared. According to the above analysis, this should be true even if all the blocks share parameters. To validate this hypothesis, we performed an experiment studying the zero-shot forecasting performance of the current architecture with increasing number of blocks, both with and without parameter sharing. The architecture was trained on the test dataset and the performance was measured on specific target datasets. The results are presented in FIG. 4. On the two datasets tested, performance improvement was consistently seen when the number of blocks increases. This is true even if the parameters across blocks are shared. This provides evidence supporting the meta-learning interpretation of residual architecture. Otherwise, it is hard to explain the improvement in generalization performance without the increase in the number of parameters in the network. We can see that, in fact, the performance of architectures with and without parameter sharing is very close. Parameter sharing may thus allow for the reduction of the number of parameters in neural architectures. From the data, stacking blocks with shared parameters is a viable way to improve generalization. Regarding the scale of the improvement, on the

TABLE 1

| | M3 Average (3,003) | | TOURISM Average (1,311) | | ELECTRICITY Average (370) | | TRAFFIC Average (963) |
|---|---|---|---|---|---|---|---|
| | SMAPE | | MAPE | | ND | | ND |
| Comb S-H-D | 13.52 | ETS | 20.88 | MatFact | 0.16 | MatFact | 0.20 |
| ForecastPro | 13.19 | Theta | 20.88 | DeepAR | 0.07 | DeepAR | 0.17 |
| Theta | 13.01 | ForePro | 19.84 | Deep State | 0.083 | Deep State | 0.167 |
| DOTM | 12.90 | Stratometrics | 19.52 | | | | |
| EXP | 12.71 | LeeCBaker | 19.35 | | | | |
| N-BEATS-G | 12.47 | | 18.47 | | 0.064 | | 0.114 |
| N-BEATS-I | 12.43 | | 18.97 | | 0.073 | | 0.114 |
| N-BEATS-I + G | 12.37 | | 18.52 | | 0.067 | | 0.114 |
| N-BEATS-TL (ours) | 12.65 | | 19.22 | | 0.085 | | 0.164 |

There were a number of notable points about the results detailed in Table 1 above. First, the current architecture model in the zero-shot forecasting regime consistently performs well. On some datasets, the current architecture outperforms most statistical models. On other datasets, the current architecture performs close to other neural models tourism dataset (see FIG. 4, right), the zero-shot error of 1 block is worse than the seasonal Nave (repeating the last value of the seasonal pattern, mape error of 21.25). As the number of blocks grows, the error drops below mape 19.5, thereby outperforming all the off-the-shelf statistical methods and getting close to the statistical method hand-crafted to a specific dataset. Similarly, for one specific target dataset (see FIG. 4, left) we can see the generalization performance with one block for the current architecture is worse than an off-the-shelf forecasting software ForecastPro (based on model selection between exponential smoothing, ARIMA and moving average. Increasing the number of blocks for the current architecture results in the zero-shot forecasting performance better than or at par with the best known statistical models (DOTA, a dynamically optimized Theta model; EXP, the most recent statistical approach and the previous state-of-the-art in a previous forecasting competition).

Figure 4:
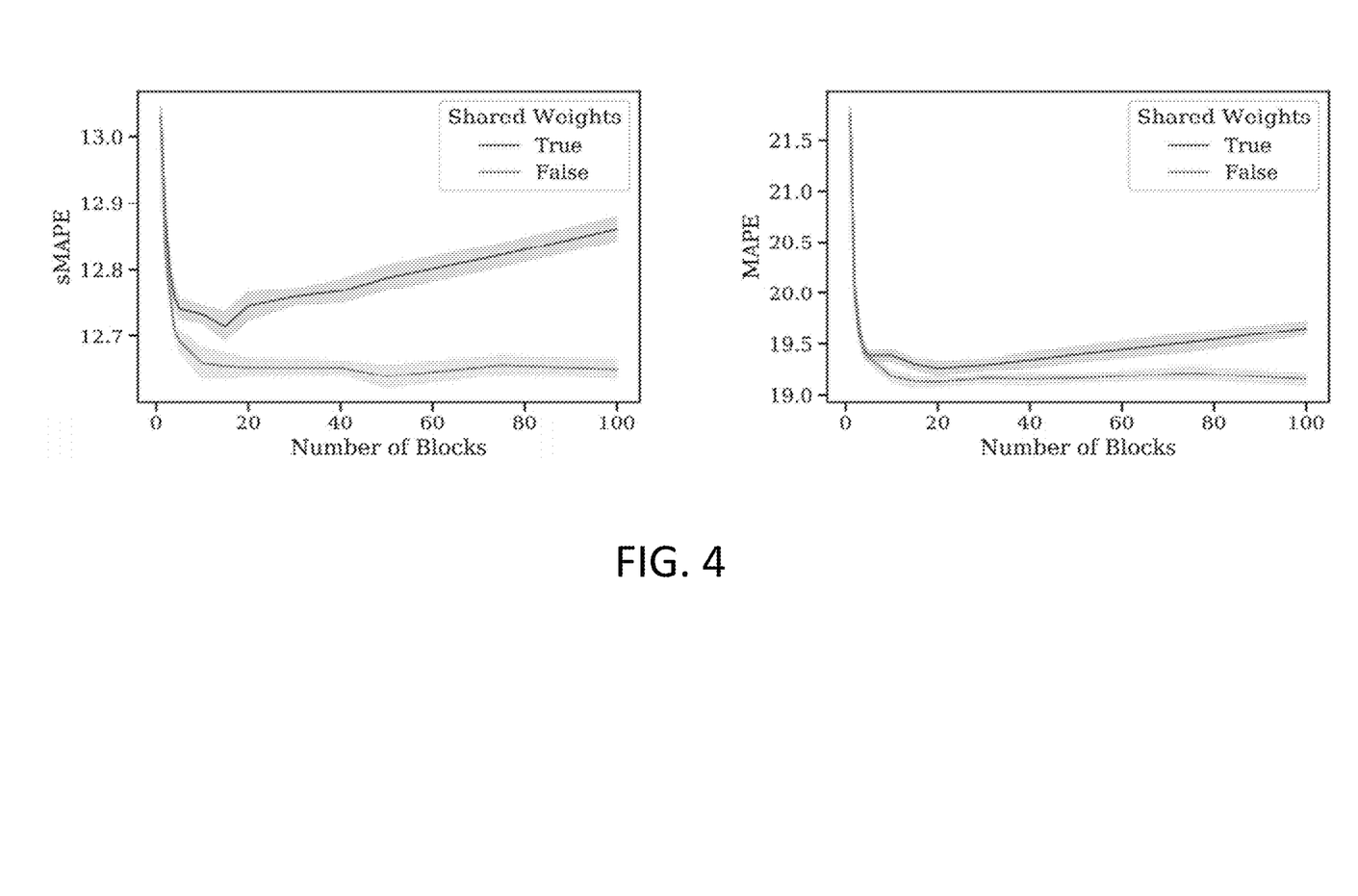
FIG. 4 illustrates the results of experiments to determine the effects, if any, of the number of blocks used with the present invention.

For FIG. 4, illustrated is the zero-shot forecasting performance of the current architecture model trained on the above noted test dataset as a source and applied to two specific datasets as target datasets with respect to the number of blocks, L. Each plot shows results for the architecture with (blue) and without (red) weight sharing across blocks with block width being set to 1024 neurons. The results are based on ensemble of 30 models (5 different initializations with 6 different lookback periods). The mean performance and one standard deviation interval (computed using ensemble bootstrap) are shown.

It can thus be seen that, zero-shot transfer learning in the time-series forecasting context is possible using a neural modeling approach. The present invention provides empirical results demonstrating that neural networks are capable of extracting generic knowledge about forecasting task and applying it to solve forecasting problem on unseen time-series. The explanation above provides a theory explaining the internal mechanisms facilitating zero-shot adaptation and this is supported with empirical evidence.

In addition to the above, residual architectures (such as the current architecture) in general are covered by the analysis presented above. Therefore, the results of these experiments may be applicable to explain, at least in part, the general success of residual architectures.

Also, in terms or memory efficiency, advantages may be had using the various methods and systems of the present invention. The present invention allows for reduced memory footprint for neural architectures. As the above analysis shows, the neural network is producing on-the-fly, task-specific parameters via residual connections. This makes it viable to share weights or layer parameters across blocks, thereby producing networks that are several times smaller in size than similar networks but with equivalent statistical performance.

The present invention allows for systems that can be used for multiple tasks. As an example, the current architecture can be configured such that each stack in a multi-stack system can be trained on a different data set for similar tasks. The system can then be deployed to handle the similar tasks without the need to retrain for each of the similar tasks. For such a deployment, each stack may be tested/assessed at deployment to determine which stack is most suited for a specific task. As an example, the system may be deployed for a specific time series forecasting task. The various stacks may thus be trained on different data sets with each training data set being from a different time series (e.g., one for finance related time series, another for traffic related time series, and a further one for energy consumption related data). Once deployed, the system can perform the specific time series forecasting task using any of the pre-trained stacks as noted above.

In another implementation, the present invention allows for NLP (natural language processing) tasks to be performed using systems trained on data sets similar to the targeted language or domain. As an example, instead of having an NLP system trained for a specific specialty, an NLP system trained on a general data set for the same language (and having the same vocabulary as the specific domain) can be used. Thus, instead of an NLP system specifically trained and configured for an English-based civil engineering application, an NLP system trained on general English and with engineering vocabulary may be used. As well, in the NLP space, instead of having to train an NLP system using a specific person's speech and voice patterns, an NLP system trained on different voice and speech patterns (but using the same language) may be used. Of course, for NLP processing, the concept is that the target data is not to be found in the training data set. This generally holds true for the present invention—the trained system would be trained on a training data set and would be used on a target data set, with the target data set being absent from the training data set.

Preferably, the training data set is related to the target data set in that the type of data sets are similar (i.e. a time series training data set would be used to produce a time series target data set and, for an image identification task, an image training data set would be used to produce an image target data set). The present invention allows for machine learning systems that have parameters that are fully shared between execution blocks and where there are multiple stacks of fully connected layers of neural network nodes. These parameters would be the parameters used for the various layers of nodes. Such machine learning systems preferably have a residual architecture. These machine learning systems would be trained on one or more training data sets to execute one or more specific tasks on one or more target data sets. As noted above, the training data sets and the target data sets are somewhat related but the target data sets are preferably not subsets of or part of the training data set.

These machine learning systems learn from the training data sets and apply that learning to the target data sets. However, it should be clear that the present invention can lessen the need for specialized training data sets to perform a specific task. A generic training data set that is somewhat related to the specific task can be used to train the machine learning system. As an example, if the task is to identify automobiles in an image target data set, the system can be trained on an image training data set of vehicles. As another example, if the task is to forecast a time series from a target data set of financial data, the system may be trained on data sets comprising weather, traffic, or other time series based data.

Regarding implementation, the system of the present invention may be implemented on suitable hardware and software as understood by those of skill in the art. It should be clear that, in one implementation, the system may be implemented as a fully software system to be executed on generic hardware systems. Thus, for such an implementation, each of the stacks in FIG. 3, as well as each of the blocks in FIG. 3, is a software construct in a hardware system's memory.

In another implementation, a hardware based implementation may use one or more processing modules for each of the blocks/layers in the architecture. For such an implementation, each layer illustrated in FIG. 2 (and each of the blocks in FIG. 3) can be implemented as one or more hardware processing modules. One potential issue with such an implementation is that adding more blocks or layers may require adding hardware processing modules to the system.

Yet a further implementation may minimize the hardware requirements for an implementation. For this implementation, a single processing module may be used as the blocks/layers in the architecture. For such an implementation, the data input into block 1 would be fed into the single processing module to produce the block 1 outputs. These block 1 outputs are then stored or accumulated as necessary. The relevant block 1 outputs (i.e. the residual outputs) are then fed back into the single processing module along with the inputs to block 2. The resulting block 2 results are then accumulated with the block 1 results are necessary and the relevant block 2 results (i.e. the block 2 residual results) are then fed back into the single processing module as block 3 inputs. The process can then be repeated as necessary until a final result is achieved or until a sufficient amount of blocks have executed their inputs.

Another implementation may be a hybrid of the last two implementations described above. For this implementation, instead of having a single processing module or an unending number of processing modules, a fixed number of processing modules would be used. These processing modules would then be used to process inputs as a cascading group. Thus, if there are 3 processing modules, then, in the first iteration, the three processing modules would be used to implement blocks 1, 2, and 3. The outputs of these 3 blocks would be accumulated as necessary and the residual output of block 3 would be fed back as input for block 4. Then, in the next iteration, the three processing blocks would be used to implement blocks 4, 5, and 6. The process would then repeat as necessary with the fixed number of processing blocks being used to implement the multiple blocks/layers.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A neural network system for use in executing a task, the system comprising:
   a plurality of basis stacks, said basis stacks being coupled in sequence with each basis stack comprising at least two execution blocks, an output of each basis stack being added to a cumulative output for said neural network system;
   wherein
   each of said at least two execution block comprises:
   a stack of fully connected layers of neural network nodes, said stack having an output being received in parallel by a first parallel branch and a second parallel branch;
   said first parallel branch comprising:
   a first fully connected layer of neural network nodes receiving said output and a first waveform generator sub-unit receiving an output of said first fully connected layer;
   said second parallel branch comprising:
   a second fully connected layer of neural network nodes receiving said output and a second waveform generator sub-unit receiving an output of said second fully connected layer;
   and wherein
   an output of said first parallel branch is a synthesis of basis functions of said execution block;
   an output of said second parallel branch is used to form a residual of an input to said execution block;
   parameters are shared between execution blocks;
   different basis stacks are trained using different training data sets such that different basis stacks are suitable for different tasks; and
   said system is suitable for deployment for said different task absent specialized retraining for said different tasks.

2. The system according to claim 1, wherein said task is time series forecasting.

3. The system according to claim 1, wherein said system is trained using at least one training data set and, after training, inputs to said system being at least one target data set, said at least one target data set being absent from any of said at least one training data set.

4. The system according to claim 3, wherein said at least one training data set is similar to said at least one target data set.

5. The system according to claim 1, wherein said parameters shared between blocks includes adaptive parameters for adjusting a behavior of subsequent execution blocks.

6. The system according to claim 1, wherein said parameters shared between blocks includes learnable parameters for said layers.

7. The system according to claim 1, wherein said task is at least one of: image identification and natural language processing.

8. The system according to claim 1, wherein said parameters include task-specific parameters being produced by said execution blocks.

9. An execution block for use with a neural network system, the execution block comprising:

a stack of fully connected layers of neural network nodes, said stack having an output being received in parallel by a first parallel branch and a second parallel branch;

said first parallel branch comprising:

a first fully connected layer of neural network nodes receiving said output and a first waveform generator sub-unit receiving an output of said first fully connected layer;

said second parallel branch comprising:

a second fully connected layer of neural network nodes receiving said output and a second waveform generator sub-unit receiving an output of said second fully connected layer;

wherein an output of said first parallel branch is a synthesis of basis functions of said execution block;

an output of said second parallel branch is used to form a residual of an input to said execution block;

parameters are shared between different execution blocks;

different basis stacks are trained using different training data sets such that different basis stacks are suitable for different tasks; and said execution block is suitable for deployment for said different task absent specialized retraining for said different tasks.

10. The execution block according to claim 9, wherein said parameters shared between blocks includes adaptive parameters for adjusting a behavior of subsequent execution blocks.

11. The system according to claim 9, wherein said parameters include task-specific parameters being produced by said different execution blocks.

12. The system according to claim 9, wherein said parameters shared between blocks includes learnable parameters for said layers.

* * * * *